(12) United States Patent
Kobayashi et al.

(10) Patent No.: US 11,772,639 B2
(45) Date of Patent: Oct. 3, 2023

(54) CONTROLLING APPARATUS AND VEHICLE (71) Applicant: HONDA MOTOR CO., LTD., Tokyo (JP)

(72) Inventors: Kazuya Kobayashi, Wako (JP); Ken Amemiya, Wako (JP); Soichiro Ueura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 609 days.

(21) Appl. No.: 16/983,158

(22) Filed: Aug. 3, 2020

(65) Prior Publication Data
US 2021/0039635 A1 Feb. 11, 2021

(30) Foreign Application Priority Data
Aug. 5, 2019 (JP) .................... 2019-143888

(51) Int. Cl.
*B60W 30/09* (2012.01)
*B60W 30/095* (2012.01)
*B60W 30/16* (2020.01)

(52) U.S. Cl.
CPC ........ *B60W 30/09* (2013.01); *B60W 30/0956* (2013.01); *B60W 30/162* (2013.01); *B60W 2540/22* (2013.01); *B60W 2540/225* (2020.02)

(58) Field of Classification Search
CPC ............ B60W 30/09; B60W 30/0956; B60W 30/162; B60W 2540/22; B60W 2540/225; B60W 50/0098; B60W 2050/0088; B60W 2520/10; B60W 2520/105; B60W 2554/4042; B60W 2754/30; B60W 30/16; B60W 30/143
See application file for complete search history.

(56) References Cited

U.S. PATENT DOCUMENTS 9,598,077 B2   3/2017   Yamakado et al.
9,919,603 B2   3/2018   Yamakado et al.
(Continued)

FOREIGN PATENT DOCUMENTS

DE   102014200896 A1 *   7/2015   ............ B60W 30/08
JP   2007-182226 A   7/2007
(Continued)

OTHER PUBLICATIONS

English Translation: Pascheka, DE 102014200896 A1, Jul. 23, 2015, German Patent Office Patent Application Publication (Year: 2015).*

(Continued)

*Primary Examiner* — Nadeem Odeh
(74) *Attorney, Agent, or Firm* — Thomas | Horstemeyer, LLP (57) ABSTRACT

An in-vehicle controlling apparatus, comprising an evaluation unit configured to evaluate a sense-of-security level a passenger may feel with respect to an object present in a traveling direction of a self-vehicle, and a signal generation unit configured to generate a predetermined signal based on the sense-of-security level, wherein the evaluation unit evaluates the sense-of-security level based on a time headway and a temporal variation component of the time headway.

10 Claims, 8 Drawing Sheets

(56) References Cited

U.S. PATENT DOCUMENTS

| | | | |
|---|---|---|---|
| 2007/0032914 A1* | 2/2007 | Kondoh | B60W 50/16 |
| | | | 701/1 |
| 2007/0078602 A1* | 4/2007 | Yamamura | B60W 30/16 |
| | | | 701/301 |
| 2016/0264135 A1 | 9/2016 | Yamakado et al. | |
| 2016/0347181 A1 | 12/2016 | Yamakado et al. | |

FOREIGN PATENT DOCUMENTS

| | | |
|---|---|---|
| JP | 6138655 B2 | 5/2017 |
| JP | 6204865 B2 | 9/2017 |
| JP | 6375034 B2 | 8/2018 |
| WO | 2015053169 A1 | 4/2015 |
| WO | 2015151565 A1 | 10/2015 |

OTHER PUBLICATIONS

Japanese Office Action for Japanese Patent Application No. 2019-143888 dated Apr. 25, 2022 (partially translated).
Makoto Itoh et al., "Vehicle Collision Prevention Assistance Technology for Reducing Traffic Accidents", First Copy, First Edition Issued on Jun. 25, 2015.

* cited by examiner

CONTROLLING APPARATUS AND VEHICLE

CROSS-REFERENCE TO RELATED APPLICATION(S)

This application claims priority to and the benefit of Japanese Patent Application No. 2019-143888 filed on Aug. 5, 2019, the entire disclosure of which is incorporated herein by reference.

BACKGROUND OF THE INVENTION

Field of the Invention

The present invention relates to an in-vehicle controlling apparatus.

Description of the Related Art

Various methods have been proposed as methods for evaluating (risk evaluation) a sense-of-security level that a passenger may feel with respect to an object, such as a preceding vehicle, that is present ahead of a self-vehicle (Japanese Patent No. 6375034, Japanese Patent No. 6204865, and Japanese Patent No. 6138655, and "Vehicle Collision Prevention Assistance Technology for Reducing Traffic Accidents" by Makoto Itoh (and 5 others), First Copy of First Edition Issued on Jun. 25, 2015). Evaluation results obtained in this way can be used for driving assistance such as adaptive cruise control (ACC).

A more appropriate evaluation method is required for improving accuracy of the above evaluations.

The present invention enables a more appropriate evaluation of the sense-of-security level that a passenger may feel with respect to an object that is present ahead of the self-vehicle and utilize that evaluation result for driving.

SUMMARY OF THE INVENTION

One aspect of the invention is an in-vehicle controlling apparatus, comprising an evaluation unit configured to evaluate a sense-of-security level a passenger may feel with respect to an object present in a traveling direction of a self-vehicle, and a signal generation unit configured to generate a predetermined signal based on the sense-of-security level, wherein the evaluation unit evaluates the sense-of-security level based on a time headway and a temporal variation component of the time headway.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

(Example of Vehicle Configuration)

Figure 1:
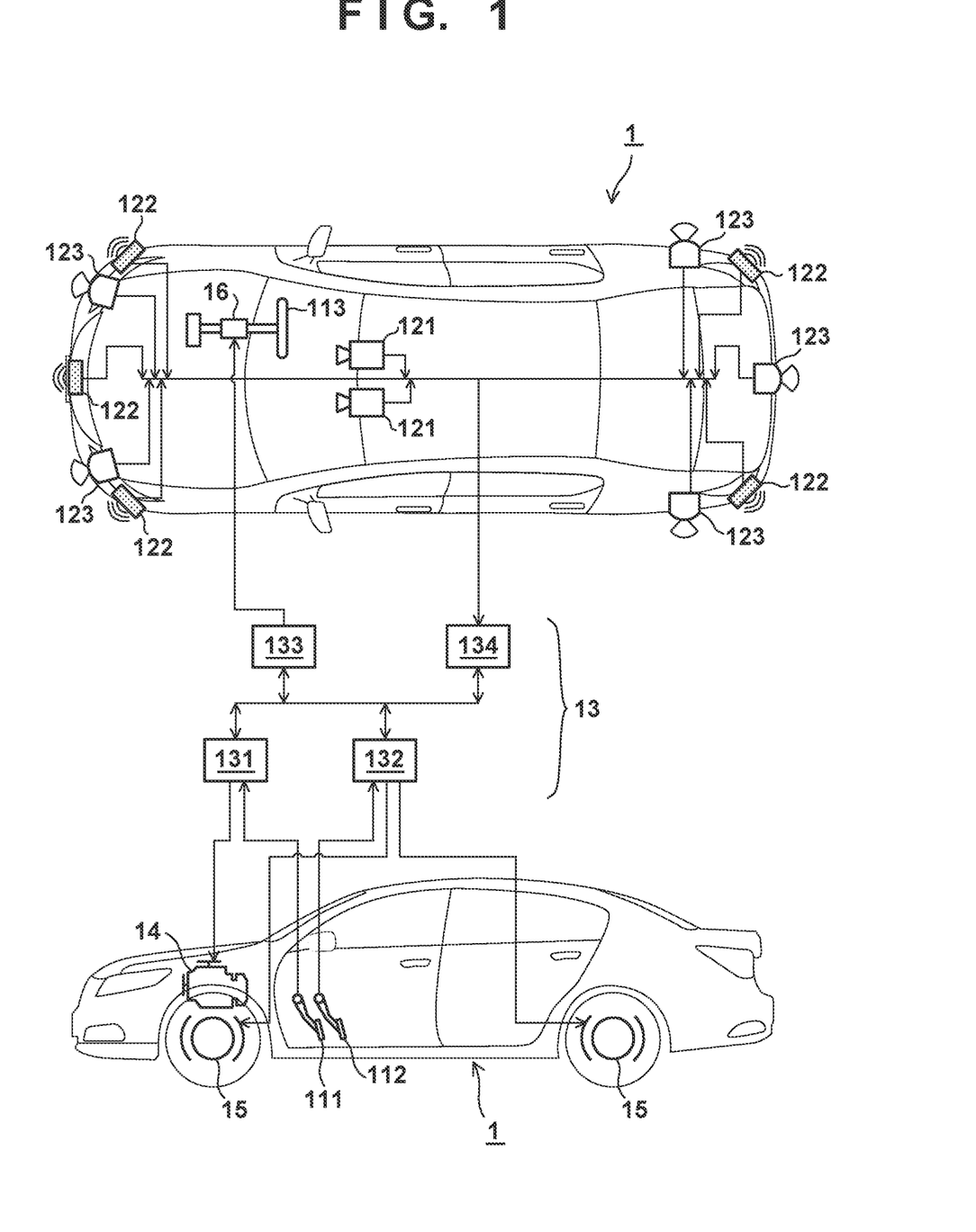
FIG. 1 is a schematic diagram for explaining an example of a vehicle configuration.
Figure 2:
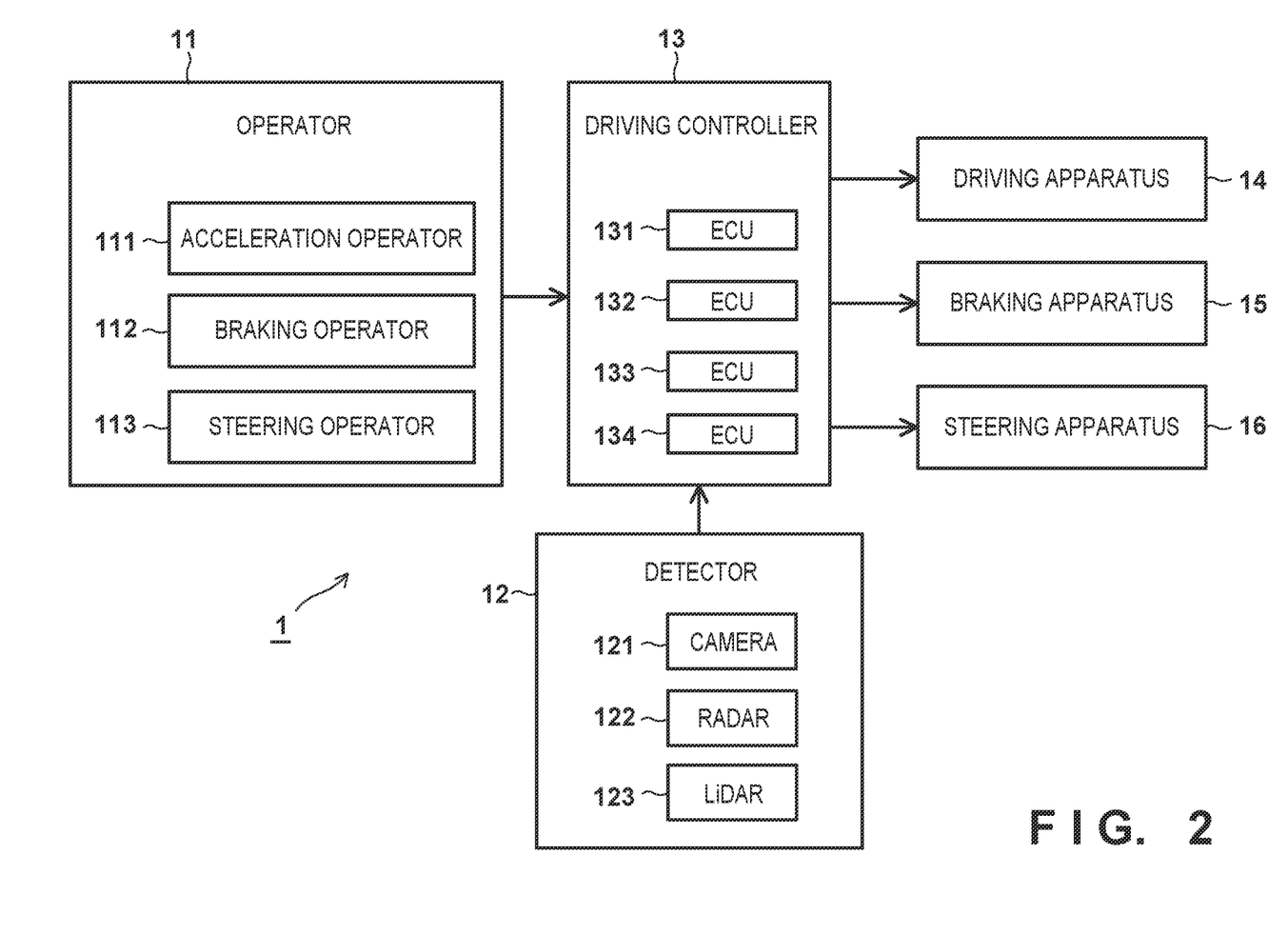
FIG. 2 is a block diagram for explaining an example of a vehicle system configuration.

FIG. 1 and FIG. 2 are diagrams for explaining a vehicle 1 configuration according to an embodiment. FIG. 1 uses a top view and a side view of the vehicle 1 to illustrate a placement position of each element explained below and a connection relationship between the elements. FIG. 2 illustrates a system configuration of the vehicle 1. Note that in the following explanations, expressions such as front/rear, upper/lower, and left/right (lateral) are used in some cases, and these are used as expressions representing relative directions with respect to the vehicle body of the vehicle 1. For example, "front" represents the front side in the longitudinal direction of the vehicle body, and "upper" represents the height direction of the vehicle body.

The vehicle 1 comprises an operator 11, a detector 12, a driving controller 13, a driving apparatus 14, a braking apparatus 15, and a steering apparatus 16. In the present embodiment, the vehicle 1 is a four-wheel vehicle, however, the number of wheels is not limited to four.

The operator 11 comprises an acceleration operator 111, a braking operator 112, and a steering operator 113. Typically, the acceleration operator 111 is an accelerator pedal, the braking operator 112 is a brake pedal, and the steering operator 113 is a steering wheel. However, for these operators 111 to 113, operators of another type such as a lever type or button type may be used.

The detector 12 comprises a camera 121, a radar 122, and light detection and ranging (LiDAR) 123, and each of these function as a sensor for detecting peripheral information of the vehicle 1. The camera 121 is an image capturing apparatus which uses, for example, a CCD image sensor or a CMOS image sensor. The radar 122 is a distance measurement apparatus such as a millimeter wave radar. Also, the LiDAR 123 is a distance measurement apparatus such as a laser radar. These, as exemplified in FIG. 1, are each placed at a position such as the front side, the rear side, the upper side, or a lateral side of the vehicle body, which enables them to sense peripheral information of the vehicle 1.

The peripheral information of the vehicle 1 is information that indicates under what kind of conditions the vehicle 1 is driving. For example, the peripheral information of the vehicle 1 indicates a driving environment (such as a direction in which a traffic lane runs, a travelable region, and a color indicated by a traffic signal) of the vehicle 1, presence or absence of objects (such as another vehicle, a pedestrian, or an obstacle) in the periphery of the vehicle 1, and the information of the object (such as an attribute, a position, and a direction speed of movement).

The driving controller 13 is configured, for example, to be able to control each of the apparatuses 14 to 16 based on a signal from the operator 11 and/or the detector 12, and in the present embodiment, comprises multiple ECUs (electric control units) 131 to 134. Each of the ECUs 131 to 134 comprises a CPU, a memory, and a communication interface, performs predetermined processing in the CPU based on information or an electrical signal received via the communication interface, and stores the processing result in the memory or outputs it to another element via the communication interface.

In the present embodiment, the ECU 131 is an ECU for acceleration, and controls, for example, the driving apparatus 14 based on the amount of operation of the acceleration operator 111 by a driver. The driving apparatus 14 comprises, for example, an internal combustion engine and a transmission. Also, the ECU 132 is a braking ECU and controls, for example, the braking apparatus 15 based on the amount of operation of the braking operator 112 by a driver. The braking apparatus 15 is, for example, a disc brake arranged for each wheel. Also, the ECU 133 is a steering ECU, and controls, for example, the steering apparatus 16 based on the amount of operation of the steering operator 113 by a driver. The steering apparatus 16 comprises, for example, power steering.

Also, the ECU 134 is a detecting ECU, and receives, for example, peripheral information of the vehicle 1 detected by the detector 12, performs predetermined processing, then outputs the processing result to the ECUs 131 to 133. The ECUs 131 to 133 is able to control each of the apparatuses 14 to 16 based on the processing result from the ECU 134. By such a configuration, the vehicle 1 is able to perform driving assistance based on a detection result (peripheral information of the vehicle 1) by the detector 12.

In the present specification, driving assistance means to perform at least a part of drive operations (acceleration, braking, and steering) on the driving controller 13 side rather than the driver side. In other words, the concept of driving assistance comprises an embodiment (so-called automatic driving) in which all of the drive operations are performed on the driving controller 13 side. An adaptive cruise control function, a lane keep assist function, and such can be given as examples of driving assistance functions.

While details will be described later, the vehicle 1 is, for example, able to perform drive control by calculating a relative relationship (such as a relative location and a relative speed) with respect to other vehicles (preceding vehicles) that are driving ahead based on a detection result of the detector 12.

From the above, the ECUs 131 to 133 correspond to a driving assistance apparatus which directly controls each apparatus for realizing driving assistance, and the ECU 134 corresponds to a controlling apparatus which outputs to the ECUs 131 to 133 a control signal necessary for driving assistance. Also, the ECUs 131 to 133 or the driving controller 13 may be expressed collectively as, for example, a driving assistance controlling apparatus.

Note that the driving controller 13 is not limited to this configuration. For example, a semiconductor apparatus such as an ASIC (an application specific integrated circuit) may be used for each of the ECUs 131 to 134. In other words, each of the functions of the ECUs 131 to 134 may be realized by either hardware or software. Also, a part or the whole of the ECUs 131 to 134 may be configured by a single ECU.

(Regarding a Sense-of-Security Level a Passenger May Feel with Respect to a Preceding Vehicle)

The vehicle 1 comprises a driving assistance function with the previously described configuration. There are cases where some parts of driving assistance may require an evaluation of a relative relationship with a preceding vehicle 2, which is driving ahead of the vehicle 1. For example, in the adaptive cruise control (hereinafter referred simply to as "ACC"), which is an example of driving assistance previously described, a technology, which appropriately evaluates based on a relative relationship with the preceding vehicle 2 the sense-of-security level that a passenger may feel with respect to the preceding vehicle 2, is required in order to appropriately perform drive control (also, the vehicle 1 may be expressed as a "self-vehicle" in order to differentiate from the preceding vehicle 2).

The above sense-of-security level is a parameter which indicates a relative relationship that should be maintained with the preceding vehicle 2 in order to avoid causing the passenger of the self-vehicle 1 to have a feeling of unease or discomfort or to avoid, in advance, causing a feeling of being too close to the preceding vehicle 2 or feeling pressured, and the sense-of-security level can also be said to indicate a psychological/emotional tolerance of the passenger. Also, the sense-of-security level may be referred to as a risk factor (in other words, a warning level with respect to the preceding vehicle 2) and such. Also, the impression that the passenger gets from seeing the preceding vehicle 2 will vary (there are individual differences). Therefore, a method that enables a broad/universal evaluation of the above sense-of-security level across various passengers is required. Also, in some cases in the explanation below, the above sense-of-security level is expressed simply as sense-of-security level.

(Regarding Parameters used in Evaluating the Sense-of-Security Level)

Here, the following is given as stereotypical examples (Japanese Patent No. 6375034, Japanese Patent No. 6204865, and Japanese Patent No. 6138655, and "Vehicle Collision Prevention Assistance Technology for Reducing Traffic Accidents" by Makoto Itoh (and 5 others), First Copy of First Edition Issued on Jun. 25, 2015) of parameters used in evaluating the sense-of-security level:

TTC (Time to Collision): time it would take for the self-vehicle 1 to reach the preceding vehicle 2, in the case it is assumed that a relative speed between the self-vehicle 1 and the preceding vehicle 2 is kept at a current state;

THW (Time Headway): time it would take to reach a position, at a certain point in time, of the preceding vehicle 2 in the case it is assumed that the self-vehicle 1 will continue to drive at the speed that it is driving at that point in time.

Figure 3:
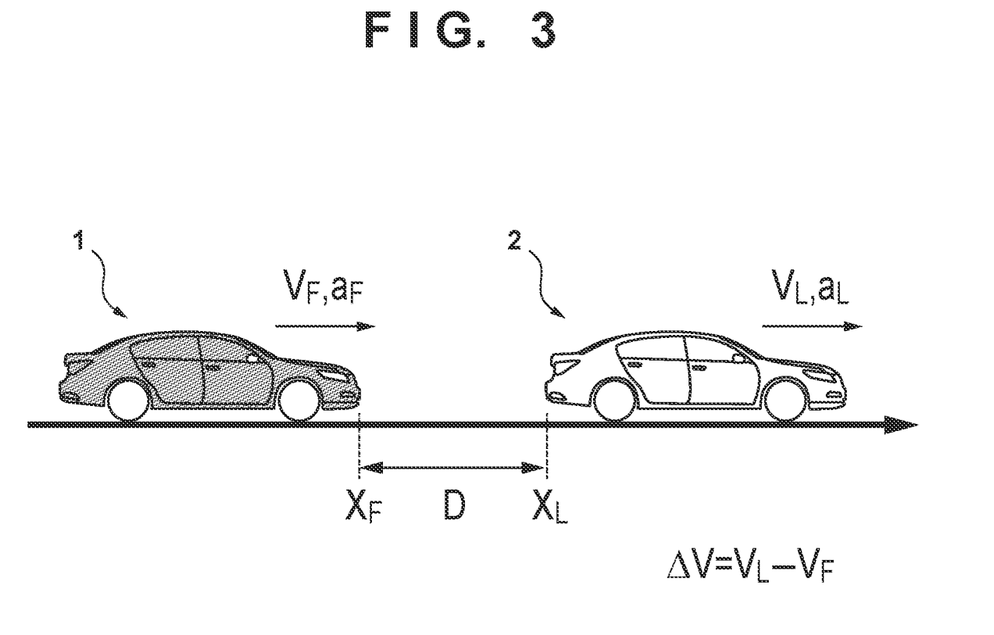
FIG. 3 is a diagram for explaining a relative relationship between a self-vehicle and a preceding vehicle.

FIG. 3 is a schematic diagram indicating a relative relationship between the self-vehicle 1 and the preceding vehicle 2 at a certain point in time.

$X_F$: a position of the self-vehicle 1
$V_F$: a vehicle speed of the self-vehicle 1
$a_F$: an acceleration of the self-vehicle 1
$X_L$: a position of the preceding vehicle 2
$V_L$: a vehicle speed of the preceding vehicle 2
$a_L$: an acceleration of the preceding vehicle 2
$\Delta V$: a relative speed between the self-vehicle 1 and the preceding vehicle 2 ($\Delta V = V_L - V_F$)

D: a distance between the self-vehicle 1 and the preceding vehicle 2, in other words, the inter-vehicle distance ($D=X_L-X_F$)

Here, the previously described TTC and THW can be expressed as:

$$TTC=D/\Delta V \qquad \text{(Equation 1)}$$

$$THW=D/V_F \qquad \text{(Equation 2)}$$

Here, TTC is calculated only using an inter-vehicle distance D and the relative speed $\Delta V$ at a certain point in time, therefore, although details will be explained later, it is difficult to appropriately evaluate the sense-of-security level in the near future thereby. Therefore, it is difficult to say that it is possible to broadly evaluate the sense-of-security level for various passengers based on TTC. Also, regarding THW, considering the case where the preceding vehicle 2 is driving (the case where the preceding vehicle 2 is not stopped), it is difficult to appropriately evaluate what the sense-of-security level will be in the near future.

Thus, according to an intensive study by the inventors, the evaluation of the sense-of-security level is performed using a THW temporal variation component (specifically, a calculation result obtained by a temporal differentiation). Here, when the THW temporal variation component is set to $\Delta THW$, it can be expressed as follows:

$$\Delta THW = d(THW)/dt = \qquad \text{(Equation 3)}$$
$$d(D/V_F)/dt = \{V_F \times d(D)/dt - D \times d(V_F)/dt\}/V_F^2$$

Because:

$$D = X_L - X_F$$

the following can be expressed by the temporal differentiation of both sides:

$$d(D)/dt = \qquad \text{(Equation 4a)}$$
$$d(X_L - X_F)/dt = d(X_L)/dt - d(X_F)/dt = V_L - V_F = \Delta V$$

Also, using the above (Equation2):

$$D=THW \times V_F \qquad \text{(Equation 4b)}$$

Also:

$$d(V_F)/dt=a_F \qquad \text{(Equation 4c)}$$

Thus, the above (Equation 3) can be reexpressed relatively simply as follows using the above (Equation 4a) to (Equation 4c):

$$\Delta THW = \qquad \text{(Equation 5)}$$
$$(V_F \times \Delta V - THW \times V_F \times a_F)/V_F^2 = (\Delta V - THW \times a_F)/V_F$$

This temporal variation component $\Delta THW$ may be expressed as a time differential value, an amount of change over time, or the like.

Also, the following is defined as an example of a parameter for evaluating the sense-of-security level described above:

$$TTC'=THW/\Delta THW \qquad \text{(Equation 6a)}$$

The TTC' can be reexpressed to enable a comparison with the above (Equation 1) using the above (Equation 2).

$$TTC'=D/(\Delta V-THW \times a_F) \qquad \text{(Equation 6b)}$$

(Regarding the Usefulness of the TTC')

Here, prior to explaining a method for evaluating the sense-of-security level based on the TTC', how the TTC' is more advantageous than the TTC for when appropriately evaluating the sense-of-security level will be described below, with reference to FIG. 4A, FIG. 4B, FIG. 5A, and FIG. 5B.

Figure 4A:
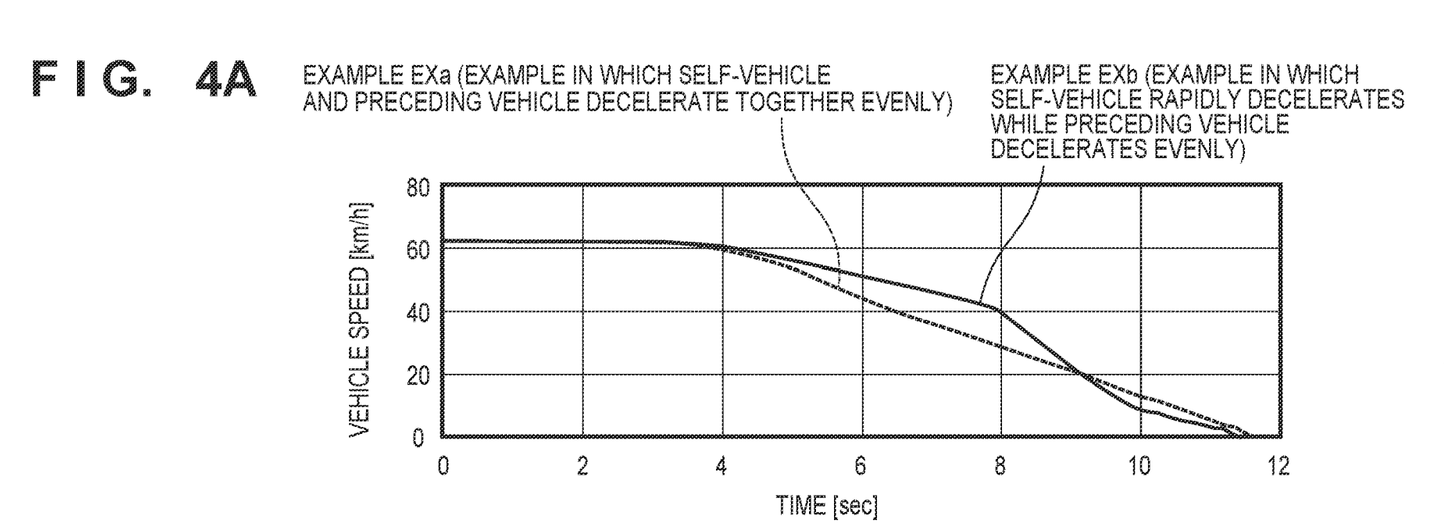
FIG. 4A is a diagram for explaining a comparison between TTC and TTC'.

FIG. 4A indicates vehicle speeds $V_F$ and $V_L$ of the self-vehicle 1 which is driving using ACC, an example of the driving assistance, and the preceding vehicle 2. Also, FIG. 4B indicates the TTC corresponding to FIG. 4A together with an evaluation result of whether or not the passenger of the self-vehicle 1 felt uneasy. In both FIGS. 4A and 4B, the horizontal axis is a time axis (unit [sec]). The vertical axis of FIG. 4A indicates the vehicle speeds $V_F$ and $V_L$ (unit [km/h]). The vertical axis of FIG. 4B indicates the TTC (unit [sec]).

Here, as an example, it is assumed that the vehicle speed $V_L$ of the preceding vehicle 2 uniformly/linearly (at a constant (negative) acceleration) decreases from 60 [km/h]. In contrast to this, an ideal example EXa is conceived as an example in which the self-vehicle 1 decelerates in the same manner as the preceding vehicle 2, in other words, an example in which the vehicle speed $V_F$ of the self-vehicle 1 decreases uniformly/linearly in the same manner as the vehicle speed $V_L$ of the preceding vehicle 2. Also, a comparative example EXb is conceived as an example in which after the preceding vehicle 2 decelerates, self-vehicle 1 rapidly decelerates and then adjusts the inter-vehicle distance D, whereby a period in which the vehicle speed $V_F$ is faster than the vehicle speed $V_L$ and a period in which it is slower are both present.

In either examples of EXa or EXb, the self-vehicle 1 is configured to enable the passenger to output a signal to indicate if the passenger feels uneasy, and here, if the passenger wishes to stop (override) the ACC, the passenger can press a predetermined switch. The "◇" mark in FIG. 4B indicates that the passenger pressed the switch. In other words, FIG. 4B indicates that in the comparative example EXb, there was an override request whereas in the ideal example EXa, there was no override request.

Figure 4B:
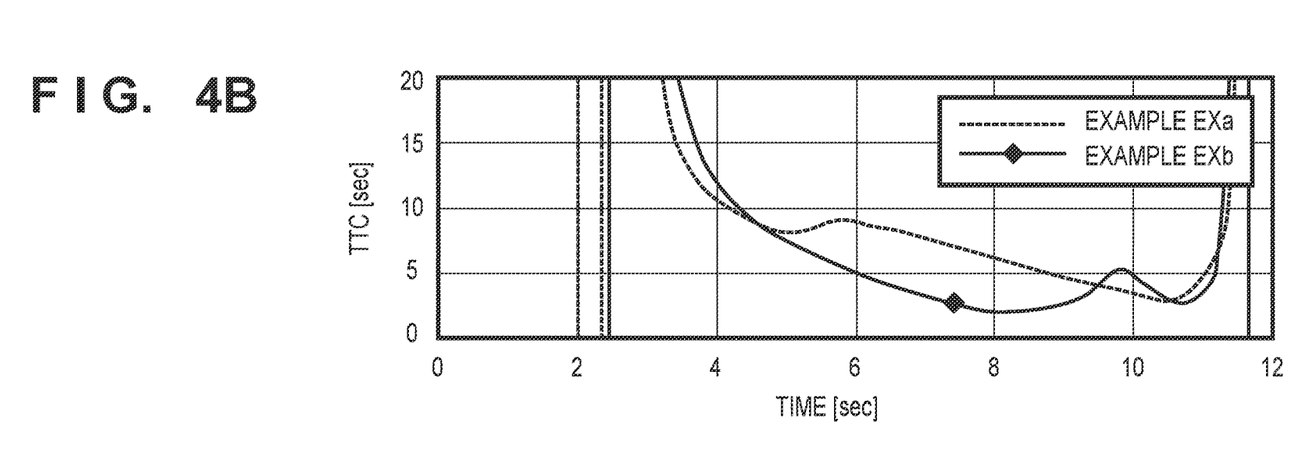
FIG. 4B is a diagram for explaining a comparison between TTC and TTC'.
Figure 5A:
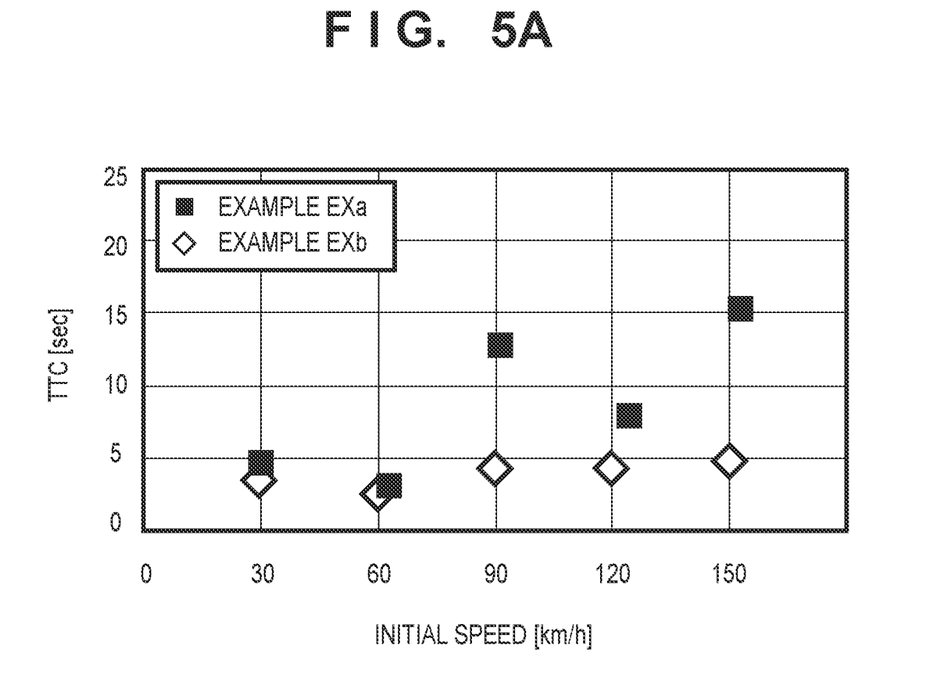
FIG. 5A is a diagram for explaining a comparison between TTC and TTC'.

FIG. 5A indicates a result that plot the TTC obtained by repeatedly performing the experiment explained with reference to FIGS. 4A and 4B. The horizontal axis of FIG. 5A indicates an initial speed (in other words, the vehicle speed values $V_F$ and $V_L$ before decelerating. In the FIGS. 4A and 4B examples, it is 60 [km/h]) of the vehicle 1 and the preceding vehicle 2. The vertical axis of FIG. 5A indicates the TTC (unit [sec]), and for the example EXa, a minimum TTC value is plotted since there was no override request, and for the example EXb, a TTC value for when there was an override request is plotted.

Figure 5B:
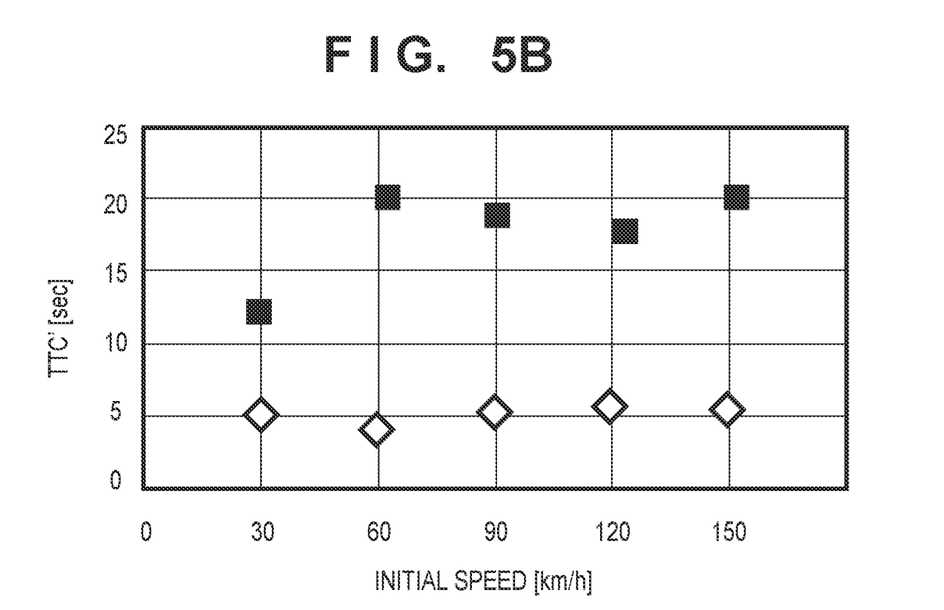
FIG. 5B is a diagram for explaining a comparison between TTC and TTC'.

FIG. 5B, similarly to FIG. 5A, indicates results that plot the TTC' obtained by repeatedly performing the experiment that was explained with reference to FIGS. 4A and 4B.

For example, according to the TTC plot results (refer to FIG. 5A), the examples EXa and EXb can be differentiated for regions (for example, a region with a vehicle speed of 90 [km/h] and above) with a relatively fast vehicle speed. In contrast to this, is difficult to differentiate between the examples EXa and EXb for regions (for example, regions with a vehicle speed of 60 [km/h] and below) with a relatively slow vehicle speed.

On the other hand, according to the TTC' plot results (refer to FIG. 5B), it can be said that the examples EXa and EXb can be differentiated for all vehicle speed regions (here, regions between vehicle speeds 30 to 150 [km/h]) shown graphically. Also, it can be said that in the example in FIG. 5B, the examples EXa and EXb can be differentiated based on whether or not the TTC' is greater than or equal to 7.

To summarize, as understood from comparing FIGS. 5A and 5B, it can be said that the example EXa which had no override request and the example EXb which had an override request can be determined by referring to the TTC'. Thus, the TTC' can be suitably used for when appropriately evaluating the previously described sense-of-security level. Alternatively, it is substantially also possible to determine the sense-of-security level solely based on the TTC'.

(Regarding a Method for Evaluating the Sense-of-Security Level)

A method for evaluating the sense-of-security level in relation to the preceding vehicle 2 by using some of the previously described parameters such as the THW, TTC, and/or TTC' is examined below.

Reference Example

First, the sense-of-security level (sense-of-security level RF0) for a reference example is given by:

$$RF0 = A/THW + B/TTC \quad \text{(Equation 7a)}$$

A: a predetermined coefficient
B: a predetermined coefficient

The above coefficients A and B are coefficients for weighting and adding 1/THW and 1/TTC, and the values may be different depending on the manufacturer, the model, and such. In this reference example, the following is set (it shall be the same in other examples later described):

A=1
B=-5

First Example

Next, the sense-of-security level (sense-of-security level RF1) for the first example is given by:

$$RF1 = A/THW + B/TTC' \quad \text{(Equation 7b)}$$

According to the above (Equation 7a) and (Equation 7b), whether the sense-of-security level is RF0 or RF1, it can be said that the larger the value becomes, the more the possibility of causing the passenger to feel uneasy and the smaller the value becomes, the more secure the passenger is indicated to feel.

Figure 6A:
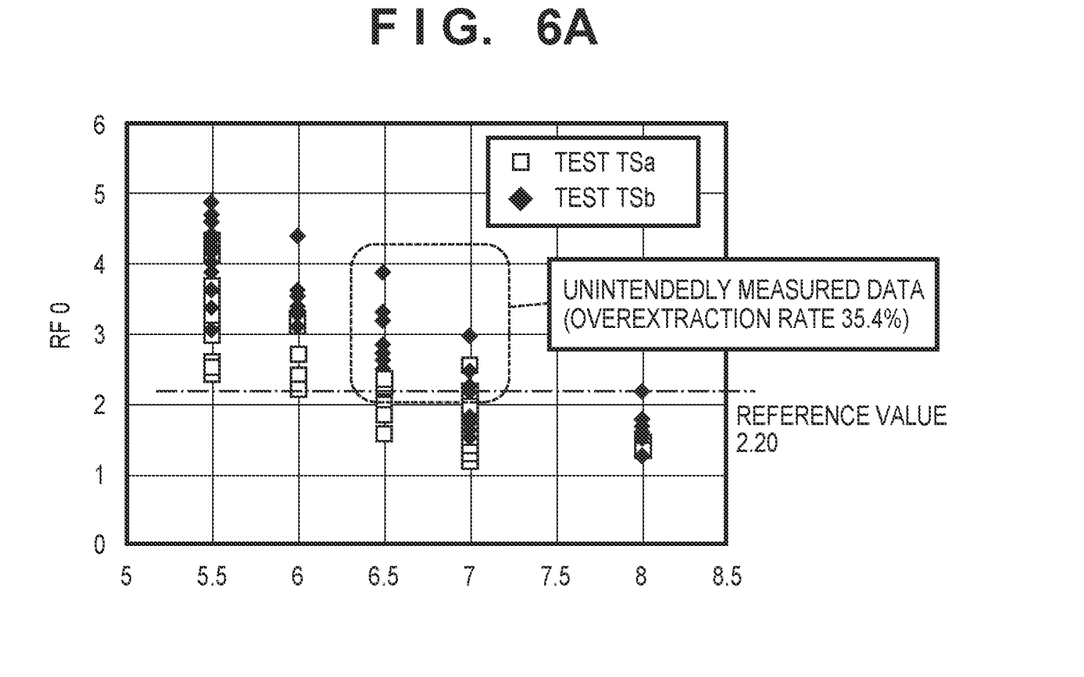
FIG. 6A is a diagram for explaining a comparison between sense-of-security levels according to an embodiment.

FIG. 6A indicates results that plot the previously described sense-of-security level RF0 obtained by repeatedly performing a driving test described later. The horizontal axis of FIG. 6A indicates a score (unit [point]) that can be obtained by scoring predetermined items in the driving test. Here, the lower the score, it is an indication that the passenger felt uneasy, and also, those with a score of 6.0 points or less had the passenger request an override and those with a score of 6.5 points or more had no override request. The vertical axis of FIG. 6A indicates the RF0 values calculated based on the above (Equation 7a).

Also, regarding the above driving test in FIG. 6A, each of the following was performed (a total of 48 times) for various deceleration conditions of the self-vehicle 1:

The ACC (test TSa) in which the self-vehicle 1, after catching up from behind the preceding vehicle 2, which is driving at a constant speed, decelerates and then performs constant speed driving to follow the preceding vehicle 2; and The ACC (test TSb) in which, while the preceding vehicle 2 which was driving at a constant speed decelerates temporarily, the self-vehicle 1, after catching up from behind the preceding vehicle 2, decelerates and then performs constant speed driving to follow the preceding vehicle 2

The above score is calculated by scoring based on predetermined items in such a driving test, and on the horizontal axis of FIG. 6A, 5.5 points (in the present example, the minimum evaluation) to 8.0 points (in the present example, the maximum evaluation) are indicated, and on the vertical axis of FIG. 6A, corresponding RF0 values are plotted.

Figure 6B:
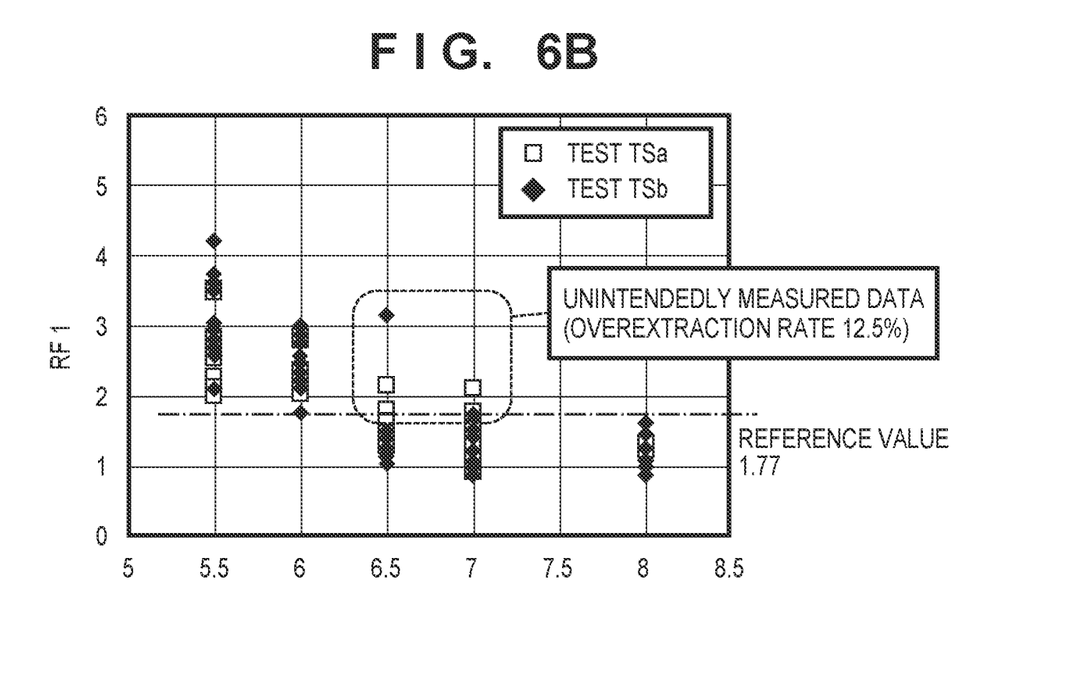
FIG. 6B is a diagram for explaining a comparison between sense-of-security levels according to an embodiment.

FIG. 6B indicates, similarly to FIG. 6A, the result of plotting the sense-of-security level RF1 obtained by repeatedly performing the above driving test. The horizontal axis of FIG. 6B indicates the score, and the vertical axis of FIG. 6B indicates the RF1 values calculated based on the above (Equation 7b). In other words, FIG. 6B can be said to be a replotting of FIG. 6A data based on the sense-of-security level RF1, or it can also be said to be a data conversion of the displayed contents from RF0 to RF1.

As previously described, there was an override request for those with a score of 6.0 points or less, and there was no override request for those with a score of 6.5 points or more. Therefore, for the maximum score (6.0 points) among the scores with an override request, the minimum RF0 value shall be the reference value (shown graphically with a one-dot dashed line) in FIG. 6A, and the minimum RF1 value shall be the reference value (shown graphically with a two-dot dashed line) in FIG. 6B. Then, the plots smaller than the reference value are determined to have been appropriately drive controlled, and the plots larger than the reference value are determined to have been inappropriately drive controlled. Note that the reference value may be expressed as a threshold, a reference value, a tolerance value, a minimum value, and the like.

According to the above determination, in FIG. 6A which is the plot result for the sense-of-security level RF0, when focusing on the plots with a score of 6.5 points or more without an override request, 17 plots are larger than the reference value (shown graphically with a one-dot dashed line). Thus, data determined to have been inappropriately drive controlled, regardless of receiving no override request, is relatively numerous. In other words, considering the overall plotting, 17 plots out of 48 plots are measured as unintended data (an overextracted rate of 35.4%).

On the other hand, in FIG. 6B which is the results of plotting the sense-of-security level RF1, when focusing on the plots with a score of 6.5 points and above without an override request, 6 plots are larger than the reference value (shown graphically with a two-dot dashed line). Thus, relatively less data is determined to have been inappropriately drive controlled, regardless of receiving no override request. In other words, from the viewpoint of the entire plot, it can be said that it becomes possible to stop the above unintended data at 6 plots out of 48 plots (an overextracted rate of 12.5%).

Therefore, by referring to the sense-of-security level RF1, it becomes possible to perform the determination of whether drive control is appropriate/inappropriate relatively easily.

(Regarding the Evaluation of the Sense-of-Security Level Involving a Correction)

Referring once again to the above (Equation 7a), specifically $$RF0 = A/THW + B/TTC$$

the sense-of-security level RF0 can be thought of separately as an element "A/THW" and an element "B/TTC".

In light of the previously described definition (in other words, the time it would take to reach a position, at a certain point in time, of the preceding vehicle 2 in the case it is assumed that the self-vehicle 1 will continue to drive at the speed that it is driving at that point in time) of THW, it can be said that the element "A/THW" indicates feeling pressured with respect to the preceding vehicle 2. This pressured feeling can also be said to be unease that may occur in the passenger due to the "closeness" itself of the preceding vehicle 2 at a certain point in time.

On the other hand, in light of the previously described definition (in other words, the time it would take for the self-vehicle 1 to reach the preceding vehicle 2, in the case it is assumed that a relative speed between the self-vehicle 1 and the preceding vehicle 2 is kept at a current state) of TTC, it can be said that the element "B/TTC" indicates the feeling of closeness to the preceding vehicle 2. This feeling of closeness can also be said to be an unease that may occur in the passenger due to "approaching" the preceding vehicle 2 as time progresses.

Similarly to the above (Equation 7b) indicating the sense-of-security level RF1, specifically:

$$RF1=A/THW+B/TTC'$$

In other words, it can be said that the element "A/THW" indicates the pressured feeling with respect to the preceding vehicle 2, and the element "B/TTC'" indicates the feeling of closeness with respect to the preceding vehicle 2.

Here, focusing on the definition of the above THW (=D/$V_F$) again in considering at which inter-vehicle distance D and/or the speed $V_F$ an override request may be generated, it possible to consider that it would be possible to add further improvement to the above element "A/THW" as another method for evaluating the sense-of-security level.

Figure 7A:
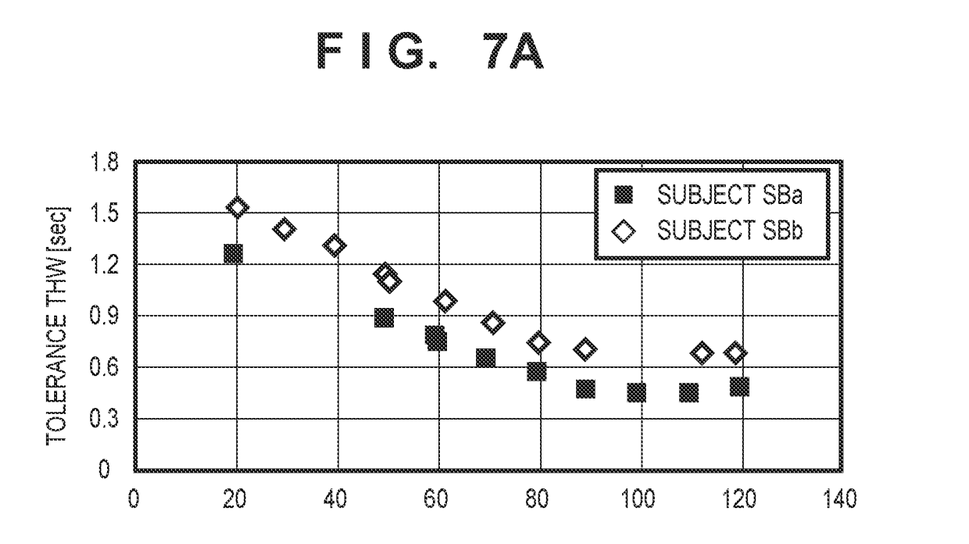
FIG. 7A is a diagram for explaining an example of a THW correction method.

FIG. 7A is results of measuring THW (in other words, the THW which may cause unease in the passenger. Hereinafter referred to as "tolerance THW") in which the passenger may generate an override request for when (in the case, ΔV=0) the self-vehicle 1 and the preceding vehicle 2 are driving together at the same speed. The horizontal axis of FIG. 7A indicates the vehicle speeds $V_F$ and $V_L$ (unit [km/h]). The vertical axis of FIG. 7A indicates the tolerance THW (unit [sec]).

For example, when focusing on a particular passenger, a subject SBa, in regions (for example, the vehicle speed is 80 [km/h] or above) in which the vehicle speed $V_F$ is relatively large, it is known that when the THW becomes smaller than 0.4 to 0.6, an override request is performed. Also, in regions (for example, the vehicle speed is 80 [km/h] or below) in which the vehicle speed $V_F$ is relatively small, it is known that even if a value is larger than the above THW, an override request is performed. Also, the same tendency as above was seen in another passenger, a subject SBb.

Thus, as indicated in FIG. 7A, the tolerance THW is almost constant for the regions with a relatively large vehicle speed regardless of the vehicle speed $V_F$ whereas the tolerance THW is almost linearly increasing as the vehicle speed $V_F$ decreases for the region with a relatively slow vehicle speed. Note that although the subjects SBa and SBb were explanatorily illustrated as passengers, the above tendencies can be said to be broadly/universally typical.

To eliminate such vehicle speed dependency of the tolerance THW, it is conceivable to perform a THW correction for when evaluating the above the sense-of-security level RF1.

Figure 7B:
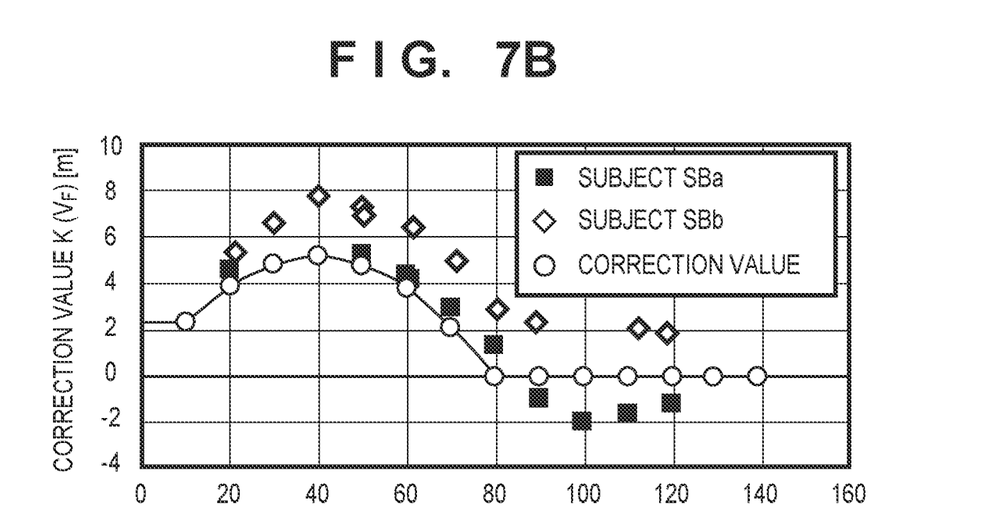
FIG. 7B is a diagram for explaining an example of a THW correction method.

FIG. 7B shows a correction value (hereinafter referred to as a correction value K ($V_F$)) for correcting the inter-vehicle distance D prior to the calculation of the sense-of-security level. The horizontal axis of FIG. 7B represents the vehicle speed $V_F$ (unit [km/h]). The vertical axis of FIG. 7B represents the correction value K ($V_F$) (unit [m]).

The correction value K ($V_F$) is determined based on the tolerance THW indicated by the dashed line in FIG. 7A, and specifically is determined by performing an equivalent conversion on the tolerance THW (unit [sec]) so that it becomes a parameter corresponding to the inter-vehicle distance D. Here, the correction value K ($V_F$) can be calculated by multiplying the vehicle speed $V_F$ and the corresponding tolerance THW.

The inter-vehicle distance D can be corrected by using this correction value K($V_F$):

$$D_{OFFSET}=D+K(V_F) \qquad \text{(Equation 8)}$$

This correction can be expressed as an offset correction and similarly, the correction value K($V_F$) can be expressed as an offset correction value. Note that the correction value K($V_F$) can be multiplied by a predetermined gain.

The THW ("$THW_{OFFSET}$" for differentiation) corresponding to the corrected inter-vehicle distance $D_{OFFSET}$ can be expressed as:

$$THW_{OFFSET}=D_{OFFSET}/V_F \qquad \text{(Equation 2')}$$

In other words, it can also be said that $THW_{OFFSET}$ is a parameter obtained by correcting THW using the correction value K($V_F$).

Second Example

Here, the second example of the sense-of-security level (sense-of-security level RF2) uses the above corrected $THW_{OFFSET}$:

$$RF2=A/THW_{OFFSET}+B/TTC' \qquad \text{(Equation 7c)}$$

Note that in the above (Equation 7c), it can be said that the more the sense-of-security level RF2 increases, the higher the possibility that the passenger will be caused to feel uneasy, and the more the RF2 decrease, the more it indicates that the passenger may feel secure.

Figure 8:
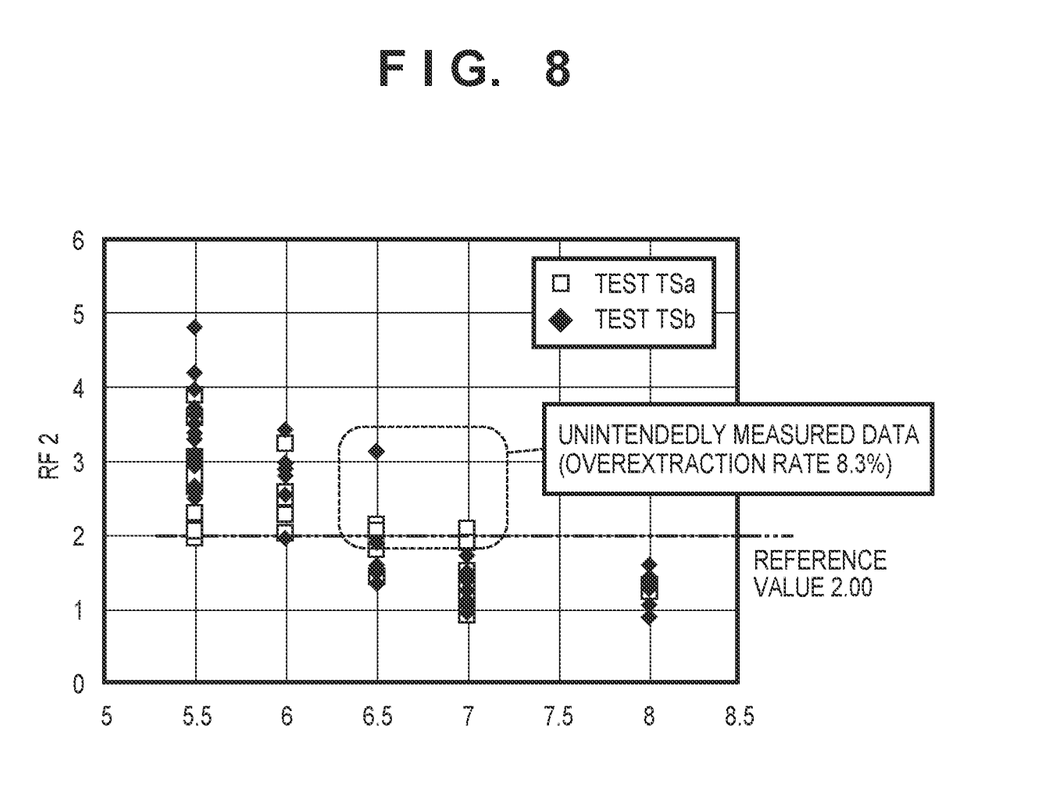
FIG. 8 is a diagram for explaining a comparison between sense-of-security levels according to an embodiment.

FIG. 8 indicates, similarly to FIGS. 6A and 6B, the plot result for the sense-of-security level RF2 obtained by repeatedly performing the previously described driving test. The horizontal axis of FIG. 8 indicates the score, and the vertical axis of FIG. 8 indicates the RF2 values calculated based on the above (Equation 7c). In other words, FIG. 8 can be said to be a replotting of FIGS. 6A and 6B data based on the sense-of-security level RF2, or it can also be said to be a data conversion of the displayed contents from RF0 or RF1 to RF2.

Regarding FIG. 8 which is a result of plotting the sense-of-security level RF2, it is possible to perform a determination of whether the drive control is appropriate/inappropriate by setting a reference value (shown graphically with the two-dot dashed line) similarly to FIGS. 6A and 6B. In FIG. 8, when focusing on the plots with a score of 6.5 points or more for which there was no override request, four of the plots are larger than the reference value (shown graphically with a two-dot dashed line). In other words, the data determined to have been inappropriately drive controlled, regardless of receiving no override request, is even fewer (the overextracted rate of 8.3%) than the example (the determination result based on the sense-of-security level RF1) in FIG. 6B. Therefore, by referring to the sense-of-security level RF2, it becomes possible to perform the determination of whether drive control is appropriate/inappropriate relatively easily and highly accurately.

As described above, by using the $THW_{OFFSET}$ for which the vehicle speed dependency was resolved to evaluate the pressured feeling with respect to the preceding vehicle 2, the evaluation of the sense-of-security level RF2 with respect to the preceding vehicle 2 can be performed more appropriately.

In the present example, the correction value $K(V_F)$ is, as understood from FIG. 7B, dependent on the vehicle speed $V_F$, and in a case where vehicle speed $V_F$ is greater than or equal to the predetermined reference value (here, it is 80 [km/h]), it is substantially a zero, and in a case it is the reference value or less, it takes on a finite value. This is, as previously described, due to the tolerance THW being almost constant in spite of the vehicle speed $V_F$ for regions with a relatively large vehicle speed whereas the tolerance THW is roughly linearly increasing as the vehicle speed $V_F$ decreases for regions with a relatively slow vehicle speed. Note that the reference value may be set, adjusted, or changed to any of the values in a range, for example, a 70 to 90 km/h range, in order to make it possible to execute the sense-of-security level RF2 calculation appropriately.

Also, since the correction value $K(V_F)$ is calculated by multiplying the vehicle speed $V_F$ and the corresponding tolerance THW, as understood from FIG. 7B, it takes a maximum value for when the vehicle speed $V_F$ is another reference value (here, 40 [km/h]). In other words, the correction value $K(V_F)$ which is used in the case the vehicle speed $V_F$ is another reference value is larger than the correction value $K(V_F)$ in other cases. Note that the reference value may be set, adjusted, or changed to any of the values in a range, for example, a 30 to 50 km/h range, in order to make it possible to execute the sense-of-security level RF2 calculation appropriately.

(Regarding Driving Assistance Based on the Evaluation Result of the Sense-of-Security Level)

The sense-of-security levels RF1 and/or RF2 are continuously (for example, in predetermined periods) calculated while vehicle 1 is traveling and can be utilized in driving assistance as necessary. For example, the ECU 134 continuously calculate the sense-of-security level RF 1 and/or RF2 based on the detection result by the detector 12. The ECU 134 is able to instruct a drive operation adjustment or correction such as deceleration or braking by outputting a control signal to the ECUs 131 to 133 based on the calculated the sense-of-security level RF1 and/or RF2.

Also, the above drive operation adjustment or correction may be executed in a travel mode (normal travel mode) in which driving assistance is not being performed, for example, by the driving controller 13 temporarily intervening in the drive operation or transitioning to a driving assistance mode. For example, in a state in which the braking operator 112 (the brake pedal) is being operated, an amount of operation larger than the amount of the braking operator 112 operation may be added based on the above calculated sense-of-security level RF1 and/or RF2. In this case, the vehicle 1 driver can continue a drive operation without feeling the unease that was felt due to the driver's drive operation.

(Summary)

Thus, by virtue of the present embodiment, the driving controller 13 by the ECU 134, evaluates, for example, based on the detection result by the detector 12, the sense-of-security level RF1 and/or RF2 that the passenger may feel with respect to the preceding vehicle 2 which is present in the traveling direction of the self-vehicle 1. The ECU 134 generates a predetermined signal based on the evaluated sense-of-security level RF1 and/or RF2.

This predetermined signal is typically a signal for realizing driving assistance, and an example may be a control signal for decelerating the self-vehicle, where a braking operation can be performed by outputting it to the ECU 132. As another example, this predetermined signal may be a notification signal for notifying the driver that the self-vehicle 1 is approaching the preceding vehicle 2, or a voice guide in the self-vehicle 1 may be activated to prompt an appropriate drive operation to the driver.

Here, generally, how a passenger may feel about the vehicle drive control will differ (since there are individual differences), and therefore, it is difficult to uniformly set the sense-of-security level with respect to a preceding vehicle. With respect to this, in the present embodiment, the sense-of-security level RF1 and/or RF2 is evaluated based on the THW also referred to as time headway and ΔTHW which is a temporal variation component of the THW. Therefore, as described with reference to FIG. 6B, FIG. 8, and the like, it becomes possible to evaluate a sense-of-security level RF1 and/or RF2 which can be broadly applied to a variety of passengers, making it possible to relatively easily realize drive control that makes a variety of passengers feel (tend not to feel uneasy) a sense of security. Thus, by virtue of the present embodiment, it becomes possible to utilize the sense-of-security level RF1 and/or RF2 evaluation results in driving, and for example, it becomes possible to provide an even more pleasant in-vehicle experience to a variety of passengers without performing excessive driving assistance.

In the above, for simplicity, an example of an embodiment in which driving assistance focusing on the ACC and the preceding vehicle 2 was given, however, the invention is not limited to this example. The content of the embodiment can be applied to, for example, various objects that may be present in the traveling direction of the self-vehicle 1 and can also be applied to various driving assistance in which a warning is required in relation to an object. Also, the vehicle 1 in which the driving assistance is provided was given as an example in the embodiment, however, the invention is not limited to this, and the content of the embodiment can be applied to various mobile bodies not comprising of wheels such as, for example, a ship and an airplane.

In the above explanation, for simplicity, each element was represented by a name related to its functional aspects, however, each element is not limited to those comprising of the contents explained in the embodiment as a main function and may supplementarily comprise of those contents.

(Summary of Features)

Some embodiment features are summarized below:

A first aspect is directed to an in-vehicle controlling apparatus (for example, reference numeral 13 and 134), wherein the controlling apparatus comprises an evaluation unit (for example, reference numeral 1) configured to evaluate a sense-of-security level (for example, RF1 or RF2) a passenger may feel with respect to an object (for example, reference numeral 2) present in a traveling direction of a self-vehicle and a signal generation unit configured to generate a predetermined signal based on the sense-of-security level, wherein the evaluation unit evaluates the sense-of-security level based on a time headway (for example, THW) and a temporal variation component (for example, ΔTHW) of the time headway. Generally, how a passenger feels regarding vehicle drive control differs (due to individual differences), and therefore it is difficult to set a sense-of-security level. By virtue of the above first aspect, it becomes possible to appropriately evaluate a sense-of-security level with respect to an object as described above. A sense-of-security level evaluated in this way can be utilized for drive control including driving assistance, and it becomes possible to realize drive control which provides a sense of security (tends not to cause passengers to feel uneasy) for various passengers relatively easily.

According to a second aspect, the predetermined signal is a control signal for decelerating the self-vehicle. By this, it becomes possible to realize drive control which provides a sense of security for a passenger.

According to a third aspect, the predetermined signal is a notification signal for notifying a driver that the self-vehicle is approaching the object. By this, it becomes possible to prompt an appropriate drive operation to a driver.

According to a fourth aspect, it is possible to express a temporal variation component of the time headway using an acceleration of the self-vehicle. By this, it becomes possible to execute a calculation of a sense-of-security level relatively easily.

According to a fifth aspect, it is also possible to express the temporal variation component of the time headway using a vehicle speed of the self-vehicle. By this, it becomes possible to execute a calculation of a sense-of-security level relatively easily.

According to a sixth aspect, the object is another vehicle traveling ahead of the self-vehicle, and it is also possible to express the temporal variation component of the time headway using a relative speed between the self-vehicle and the another vehicle. By this, it becomes possible to execute a calculation of a sense-of-security level relatively easily.

According to a seventh aspect, when the time headway is THW, the vehicle speed of the self-vehicle is $V_F$, the acceleration of the self-vehicle is $\alpha F$, the relative speed between the self-vehicle and the another vehicle is $\Delta V$, and the temporal variation component of the time headway is $\Delta THW$, $$\Delta THW = (\Delta V - THW \times \alpha F)/V_F$$

holds. By this, it becomes possible to execute a calculation of a sense-of-security level relatively easily.

According to an eighth aspect, the evaluation unit calculates a ratio (e.g. THW/$\Delta$THW(=TTC')) between the time headway and the temporal variation component of the time headway as the sense-of-security level. Thus, a sense-of-security level may be determined substantially based only on TTC'. By this, it becomes possible to realize drive control that makes provides a passenger with more of a sense of security relatively easily.

According to a ninth aspect, the evaluation unit calculates, as the sense-of-security level, a weighted sum result of a first element (e.g. A/THW) indicating the time headway and a second element (e.g. B/TTC') indicating a ratio of the time headway and the temporal variation component. By this, it becomes possible to realize drive control that provides a passenger with more of a sense of security relatively easily.

According to a tenth aspect, the evaluation unit, when calculating the sense-of-security level, uses a correction value corresponding to a vehicle speed of the self-vehicle to correct the time headway, then uses the corrected time headway (e.g. $THW_{OFFSET}$) to calculate the first element. Generally, a component in the above sense-of-security level that is based on the time headway may be different depending on the vehicle speed (may have a speed dependency). Therefore, by the tenth aspect, it becomes possible to appropriately execute a sense-of-security level calculation.

According to an eleventh aspect, the evaluation unit corrects the time headway in a case where the vehicle speed of the self-vehicle is a first reference value (for example, 80 [km/h]) or less. By this, it becomes possible to appropriately evaluate the above sense-of-security level.

According to a twelfth aspect, the first reference value is set to be within a range of 70 to 90 km/h. By this, it becomes possible to appropriately evaluate the above sense-of-security level.

According to a thirteenth aspect, a second reference value (e.g. 40 [km/h]) is a value smaller than the first reference value, and the correction value used in a case where the vehicle speed is the second reference value is larger than the correction value in a case where the vehicle speed is not the second reference value. By this, it becomes possible to appropriately evaluate the above sense-of-security level.

According to a fourteenth aspect, the second reference value is set to be within a range of 30 to 50 km/h. By this, it becomes possible to appropriately evaluate the above sense-of-security level.

According to a fifteenth aspect is directed to the vehicle (for example, reference numeral 1) and the vehicle comprises the controlling apparatus described above and a driving assistance apparatus (for example, reference numerals 13 and 131 to 133) for performing driving assistance based on a predetermined signal generated by the signal generation unit. Thus, the previously described controlling apparatus is broadly applicable to vehicles comprising a driving assistance function.

The invention is not limited to the foregoing embodiments, and various variations/changes are possible within the spirit of the invention.

What is claimed is:

1. A vehicle, comprising:
   a drive assistance apparatus configured to perform driving assistance by performing at least a part of acceleration, braking and steering of the vehicle; and
   a controller in the vehicle comprising at least one processor circuit with a memory comprising instructions, that when executed, cause the at least one processor circuit to at least:
      calculate a sense-of-security level with respect to an object present in a traveling direction of the vehicle; and
      generate, based on the calculated sense-of-security level, a control signal for decelerating the vehicle and/or a notification signal for notifying a driver that the vehicle is approaching the object, wherein
   the sense-of-security level is calculated based on a time headway and a temporal variation component of the time headway,
   the at least one processor circuit calculates, as the sense-of-security level, a weighted sum result of:
      a first element indicating the time headway, and
      a second element indicating a ratio of the time headway and the temporal variation component, and
   the at least one processor circuit, when calculating the sense-of-security level, uses a correction value corresponding to a vehicle speed of the vehicle to correct the time headway, and then uses the corrected time headway to calculate the first element.

2. The vehicle according to claim 1, wherein the temporal variation component of the time headway is expressed using an acceleration of the vehicle.

3. The vehicle according to claim 2, wherein the temporal variation component of the time headway is expressed using a vehicle speed of the vehicle.

4. The vehicle according to claim 3, wherein
   the object is another vehicle traveling ahead of the vehicle; and the temporal variation component of the time headway is expressed using a relative speed between the vehicle and the another vehicle.

5. The vehicle according to claim 4, wherein when
the time headway is THW;
the vehicle speed of the vehicle is $V_F$;
the acceleration of the vehicle is $a_F$;
the relative speed between the vehicle and the another vehicle is $\Delta V$; and
the temporal variation component of the time headway is $\Delta THW$, and $$\Delta THW = (\Delta V - THW \times a_F)/V_F$$

holds.

6. The vehicle according to claim 1, wherein the at least one processor circuit also calculates a ratio between the time headway and the temporal variation component of the time headway as the sense-of-security level.

7. The vehicle according to claim 1, wherein the at least one processor circuit corrects the time headway in a case where the vehicle speed of the vehicle is a first reference value or less.

8. The vehicle according to claim 7, wherein the first reference value is set to be within a range of 70 to 90 km/h.

9. The vehicle according to claim 7, wherein
a second reference value is a value smaller than the first reference value; and
the correction value used in a case where the vehicle speed is the second reference value is larger than the correction value in a case where the vehicle speed is not the second reference value.

10. The vehicle according to claim 9, wherein the second reference value is set to be within a range of 30 to 50 km/h.

* * * * *